UNITED STATES PATENT OFFICE.

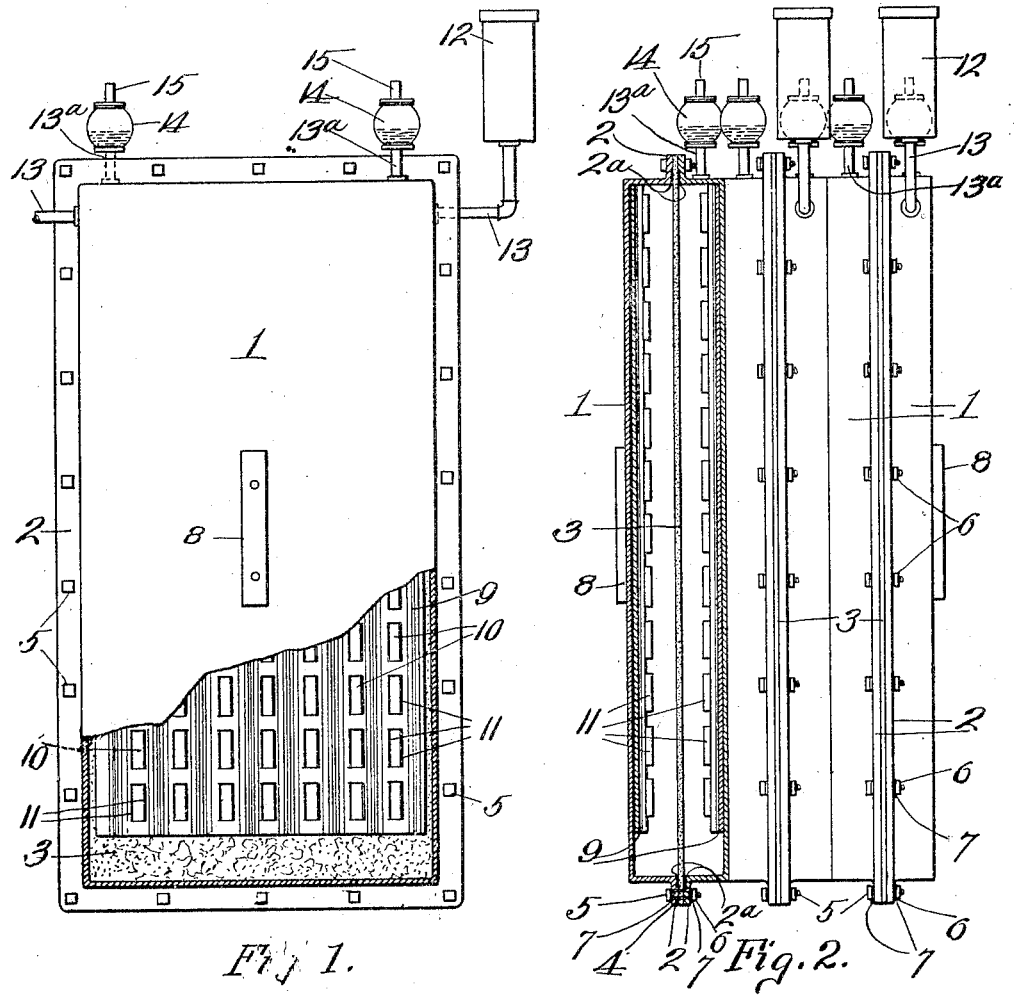

ALVAH M. GRIFFIN, OF KANSAS CITY, MISSOURI.

ELECTROLYTIC CELL.

1,327,094.     Specification of Letters Patent.     Patented Jan. 6, 1920.

Application filed August 24, 1918. Serial No. 251,311.

*To all whom it may concern:*

Be it known that I, ALVAH M. GRIFFIN, a citizen of the United States, residing at Kansas City, in the county of Jackson and State of Missouri, have invented certain new and useful Improvements in Electrolytic Cells, of which the following is a specification.

This invention relates to electrolytic cells, and has for its object to produce a device of this character which will operate efficiently and which is of very simple and economical construction.

With this general object in view the invention consists in certain novel and peculiar features of construction and combinations of parts as hereinafter described and claimed; and in order that it may be fully understood reference is to be had to the accompanying drawing, in which:

Figure 1 is a side view of an electrolytic cell embodying the invention, the cell being broken away to disclose certain features of internal construction.

Fig. 2, is a view of a battery of cells, one of them appearing in vertical section and the remainder in edge view.

Fig. 3, is a top view of a cell with the top wall broken away.

As the cells are of identical construction a description of one will suffice for all. The cell is composed of two shallow pan-members 1 provided with marginal flanges 2. The chambered sides of the pan-members face each other, and rubber or equivalent gaskets 2ᵃ are fitted against the flanges and against opposite sides of an asbestos or equivalent diaphragm 3 which divides the cell into two compartments. The gaskets form a water and gas tight connection between the pan-members and the diaphragm, and the edges of the latter are made impervious to water by dipping them in pitch or otherwise.

Sleeves 4 of insulating material are fitted through the flanges and diaphragm at suitable intervals and bolts 5 are fitted through said sleeves and engaged at their ends by clamping nuts 6, washers 7 of insulation material being interposed between the respective flanges and the heads and nuts of said bolts, so that transmission of electric current from one of said pan-members to the other must be through the electrolyte, hereinafter mentioned. A battery of these cells is simply made by securing them with their sides in contact as shown by Fig. 2, the end cells of the battery being each provided with a bus bar 8 to which electric current supply wires are adapted to be attached.

For the purpose of providing the maximum surface within the chambers of the cell for contact by the electrolyte, corrugated plates 9 are secured in each pan-member and welded to the side wall thereof along the crest of each corrugation, and in order that the current of electricity may have access to the entire body of the electrolyte within the cell to give maximum gas producing results each corrugated plate is provided between the crests of the corrugations thereof, with an opening or slot 10, the same being preferably in the form of a series of slots to avoid undue weakening of the plate, and to give the widest possible area of contact, said slots are produced by stamping I-shaped cuts and then bending the portions at opposite sides of the vertical portion of the cut inwardly between the end portions thereof as at 11. By providing the corrugated plates of the pan-members with the openings mentioned, current is free to act upon the electrolyte which stands between the corrugated plates and the adjacent pan walls, the entire body of the electrolyte being available for gas generating purposes.

To supply the cell with water—the electrolyte employed—a pair of filling cups 12 are connected by pipes 13 to the cell at opposite sides of the diaphragm thereof, it being preferable to employ two filling cups because the cell can be filled more expeditiously and maintain balanced pressure on the diaphragm. The cups stand or project above the level of the cell, and extending upward from the top of each pan-member is a tube 13ᵃ communicating with an observation chamber 14, of glass or the like, and said chamber is preferably provided with a gas discharge tube 15. The observation cup acts as a gage to show that the cell is completely filled with water, and in conjunction with the tubes 13ᵃ and 15 constitutes a vent for air when the cell is being filled and for gas when gas is generated by decomposition of the electrolyte produced by the passage of a current of electricity across the cell, it being understood that the flow of current from one side of the cell to the other will be coextensive with the side of the cell and that the entire body of the electrolyte is therefore exposed to the action of the current.

In the passage of the current, oxygen will be produced at one side of the diaphragm and hydrogen at the other according to the direction of flow of the current, the oxygen passing up through one of the discharge pipes 15 and the hydrogen through the other. Any suitable tanks for the collection of the gases may be employed, the same being omitted as forming no part of this invention.

From the above description it will be apparent that I have produced an electrolytic cell embodying the features of advantage mentioned as desirable in the statement of the object of this invention, and by which a maximum volume of gas can be generated in the shortest possible time. Furthermore a cell which can be quickly and easily joined to a similar cell or cells to produce a battery.

From the foregoing it will be apparent that I have produced an electrolytic cell which is susceptible of modification in minor particulars without departing from the principle of construction involved or the scope of the appended claims.

I claim:

1. An electrolytic cell comprising a pair of pan-members secured together with their dished sides adjacent, with a water and gas tight relation and insulated from each other, a diaphragm pervious to water dividing said cell into two compartments, and a vertically corrugated plate within and fitting flatly at the crests of its corrugations against each pan, and each plate provided between each two adjacent corrugated portions in engagement with the pan with one or more openings to admit water to the spaces between the corrugated plates and pan.

2. An electrolytic cell comprising a pair of flanged pan-members secured together with a gas and water tight relation and insulated from each other, a diaphragm dividing said cell into two compartments and composed of material through which water and electricity may pass, and a plate within each compartment and secured to the adjacent side wall of the cell, each plate being corrugated and in contact at the crests of the corrugations with the adjacent wall of the pan, and provided between the corrugations with openings and with inwardly projecting walls flanking said openings.

In testimony whereof I affix my signature.

ALVAH M. GRIFFIN.